United States Patent [19]
Sato

[11] Patent Number: 5,491,686
[45] Date of Patent: Feb. 13, 1996

[54] COMPOSITE RING NETWORK HAVING AN INCREASED REDUNDANCY FOR RESTORING COMMUNICATION PATH

[75] Inventor: Kenji Sato, Kawasaki, Japan

[73] Assignee: Fujitsu Limited, Kanagawa, Japan

[21] Appl. No.: 342,137

[22] Filed: Nov. 18, 1994

[30] Foreign Application Priority Data

Mar. 18, 1994 [JP] Japan ..................................... 6-049057

[51] Int. Cl.$^6$ ................................................. H04L 12/437
[52] U.S. Cl. ................................. 370/16.100; 370/85.15; 370/85.14
[58] Field of Search ........................ 370/16, 16.1, 58.1, 370/85.12, 85.14, 85.15, 91, 110.1, 55; 340/825.01, 825.03, 825.05, 827; 371/8.2, 11.2, 20.1; 379/26, 32, 33

[56] References Cited

U.S. PATENT DOCUMENTS

| | | | |
|---|---|---|---|
| 5,187,706 | 2/1993 | Frankel et al. | 370/85.14 |
| 5,218,604 | 6/1993 | Sosnosky | 370/16.1 |
| 5,315,582 | 5/1994 | Morizono et al. | 370/16.1 |
| 5,327,427 | 7/1994 | Sandesara | 370/16.1 |
| 5,394,389 | 2/1995 | Kremer | 370/85.14 |

*Primary Examiner*—Hassan Kizou

[57] ABSTRACT

A composite ring network includes two ring networks each having a plurality of nodes and connected to each other by a bridging path which sustains a signal format different from the one used in the ring networks. The bridging path detects a loss of communication through it and issues a failure signal in the form which is detectable by the nodes which form the ring network.

9 Claims, 12 Drawing Sheets

COMPOSITE RING NETWORK HAVING AN INCREASED REDUNDANCY FOR RESTORING COMMUNICATION PATH

BACKGROUND OF THE INVENTION

The present invention generally relates to control of networks and more particularly to control of a composite ring network that is formed of a plurality of ring networks each including a plurality of nodes connected to form a ring.

In the art of synchronous optical network called SONET, a plurality of nodes are connected to form a ring. Further, a plurality of such ring networks are connected with each other to form a larger composite ring network. In such composite ring networks, it is important to eliminate disconnection of communication even when a failure has occurred.

FIG. 1 shows a conventional example of the composite ring network.

Referring to FIG. 1, a number of nodes 84 (A–J) each including a channel part 82 having a path switch 81 and a cross connect part 83, are connected to each other according to a transmission path 85a to form a ring network 86a. Similarly, a number of nodes F–J are connected with each other according to a transmission path 85b to form another ring network 86b. Further, the ring networks 86a and 86b are connected with each other at the nodes C and F and at the nodes D and J to form a larger ring network. In practice, the ring network includes many other nodes each having a connection to other networks that may be provided by other vendors or user terminals of which illustration is omitted. Efforts are in progress to establish a standard for the signals used in the nodes A–J.

In the telecommunication between the nodes A and E, for example, the signal from the node A is sent out on both paths 88a and 88b represented by one-dotted lines, and the node E receives one of the signals on the paths 88a and 88b via a path switch 81 therein. In this case, each of the cross connect parts 83 of the nodes A–E achieves a cross connection to establish the paths 88a and 88b represented by the broken line. Thereby, there is formed a virtual double ring network.

In the telecommunication between the node A in the ring network 86a and the node H of the ring network 86b, the signal from the node A is sent out on both of the paths 87a and 87b, and the node H receives the signal via the path switch 81 therein that selects one of the paths 87a and 87b. In this case, the cross connect parts 83 of the nodes A–J conduct a cross connection for forming the paths 87a and 87b indicated by the broken lines.

In the network of FIG. 1 formed of the ring networks 86a and 86b, it is possible to construct the transmission paths 85a and 85b by optical fibers, and transmit optical signals formed as a result of multiplexing of the STS (Synchronous Transmitter Signal) signals having a transmission rate of about 500 Mbps, in the form of such as OC-3, OC-12 or OC-48 format that are used commonly in the SONET. Further, the ring networks 86a and 86b are connected with each other at the nodes C and F and at the node D and J, by means of a asynchronous signal path for asynchronous signals such as the signals of the standard DS1 level having a transmission rate of 1.544 Mbps, the signals of the DS1C level having a transmission rate of 3.152 Mbps, the signals of the standard DS2-level having a transmission rate of 6.312 Mbps, the signals of the DS3 level having a transmission rate of 44.736 Mbps, and the like.

FIG. 2 explains the construction of a conventional node. More particularly, FIG. 2 shows the details of the nodes D and J of FIG. 1 in the state that a cross connection is achieved in the STS-level in the both ring networks and that a connection is achieved between the nodes D and J in the DS3-level.

Referring to FIG. 2, each of the nodes D and J includes a pair of conversion units 91 and 95 for converting received optical signals on the ring network respectively via an east side path ES connected to the node C or node F and a west side path WS connected to the next node E or node I, to corresponding electric signals of the STS-level and further for converting STS-level electric signals supplied thereto to an optical signal. Thus, the conversion unit 91 sends out the STS-level signals supplied thereto on the east side path ES after photoelectric conversion. Similarly, the conversion unit 95 sends out the STS-level signals supplied thereto on the west side path WS after photoelectric conversion.

Further, each of the nodes D and J includes a pair of multiplexing units 92 and 94 each carrying out multiplexing and demultiplexing of the STS-level electric signals, such that the multiplexing unit 92 conducts a multiplexing of STS-level signal components supplied thereto to produce a multiplex STS-level signal as a result of the multiplexing and supplies the same to the photoelectric conversion unit 91. Further, the multiplexing unit 92 conducts a demultiplexing of the STS-level multiplex signal received from the photoelectric conversion unit 91 to produce STS-level signal components. Similarly, the multiplexing unit 94 achieves a multiplexing of STS-level electric signal components supplied thereto and sends a multiplex signal of the STS-level thus formed as a result of the multiplexing, to the photoelectric conversion unit 95. Further, the multiplexing unit 94 achieves demultiplexing of the STS-level multiplex signal supplied thereto from the photoelectric conversion unit 95 to STS-level signal components.

Further, there is provided a cross connection switch (STS-TSA) 93 in each of the nodes D and J for conducting a cross connection of the STS-level signal components supplied from the multiplexing unit 92 or 94 and for sending the same to the multiplexing unit 94 or 92 after a cross connection conducted by the exchange of the time-slots in the STS signal level. Thus, the STS-level signal components demultiplexed by the multiplexing unit 92 is transferred to the multiplexing unit 94 after the cross connection of the time-slots, and vice versa.

In each of the nodes D and J, it will be noted that a number of channels (CH1–CHn) 96 are provided in connection to the cross connection switch 93, wherein each channel such as the channel CH1 includes a multiplexing unit 97 for supplying a multiplexed signal of the STS-level to the cross connection switch 93 for insertion to the traffic on ring network and a mapping unit 98 supplied with DS3-level signals for converting the same to the STS-level signals and sending the STS-level signals thus formed to the multiplexing unit 97. Further, there are provided an STS path switch unit 99 for selecting one of the east side path ES connected to the next node C and the west side path WS connected to the next node E, and a demapping unit 100 for converting the STS-level signals branched from the ring network at the cross connect switch 93 to the DS3 level signals.

In operation, an optical signal such as the one having the OC3-level format is transmitted via the transmission path on the ring network and supplied to the photoelectric conversion unit 91 or 95, wherein the photoelectric conversion unit 91 or 95 produces a corresponding STS-level electric signal and supplies the same to the multiplexing unit 92 or 94. Thus, the multiplexing unit 92 or 94 achieves a demultiplexing of the STS-level signal supplied thereto to respective signal components, and supplies the same to the cross connection unit 93. The STS signal components thus produced are then supplied to the cross connection switch 93 for cross connection by exchanging the time-slots and are further sent to the multiplexing unit 94 or 92 for multiplexing. The multiplex signal thus formed is then sent out on the transmission path after conversion to the optical signal in the conversion unit 95 or 91.

In the illustrated example, it should be noted that the cross connection unit 93 of the node D or node J connects the multiplex signal from the multiplexing unit 97 of the channel unit (CH1) only to the west side path WS. Further, the STS path switch unit 99 is supplied with the STS-level multiplex signals on the both paths ES and WS, after they are branched by the cross connection unit 93, wherein only the signals from the west side path WS are selected in the illustrated state. As a result, a path is formed between the nodes D and J as indicated by the broken line in FIG. 1.

In the state of FIG. 2, it should be noted that the nodes D and J are connected by a signal path for signals of the DS3-level. Thereby, the mapping unit 98 maps the asynchronous DS3-level signal of 44.736 Mbps to the synchronous STS-level having the transmission rate of about 50 Mbps, while the demapping unit 100 demaps the DS3 signal of 44.736 Mbps from the STS-level having the rate of about 50 Mbps.

In such a construction of the nodes D and J, the STS path switch 99 selects the path in the STS-level. For example, the STS path switch 99 changes the selection of the path upon detection of an alarm indication signal STS-AIS having the STS-level and indicating the occurrence of failure in the current communication path. It should be noted that the alarm indication signal AIS received via the west side WS indicates that there occurred a failure somewhere in the west side path WS. Thus, the STS path switch 99 switches to the defect-free east side path ES upon occurrence of the failure in the west side path WS. It should be noted that other nodes have a similar construction.

FIG. 3 explains a conventional example for conducting a cross connection in the VT (virtual terminal) level and shows the details of the nodes D and J.

Thus, it will be noted that each of the nodes D and J includes photoelectric conversion units 101 and 105 for receiving an optical signal from the ring network and for converting the received optical signal to an electric signal of the VT-level. The conversion units 101 and 105 further conduct a conversion from a VT-level electric signal to an optical signal and send out the optical signal thus formed on the transmission path of the ring network. Further, there are provided multiplexing units 102 and 104 for conducting multiplexing and demultiplexing of the VT-level signals such that VT-level signal components are multiplexed to form the VT-level multiplex signals, wherein the multiplexing unit 102 receives a VT-level multiplex signal from the photoelectric conversion unit 101 for producing VT-level signal components therefrom as a result of demultiplexing. The multiplexing unit 102 further receives VT-level signal components to form a VT-level multiplex signal and supplies the same to the photoelectric conversion unit 101 for transmission. Similarly, the multiplexing unit 104 receives a VT-level multiplex signal from the photoelectric conversion unit 105 for producing VT-level signal components therefrom as a result of demultiplexing. The multiplexing unit 104 further receives VT-level signal components to form a VT-level multiplex signal and supplies the same to the photoelectric conversion unit 101 for transmission.

Further each of the nodes D and J includes a cross connection switch (VT-TSA) 103 of the VT-level for conducting cross connection of the VT-level signal components between the multiplexing units 102 and 104, by carrying out an exchange of the time-slots in the VT signal level.

It should be noted that each of the nodes D and J further includes a number of channels (CH1–CHn) 106, wherein each channel such as the channel CH1 includes a multiplexing unit 107 supplied with VT-level signals for producing a VT-level multiplex signal, and a mapping unit 108 supplied with DSn signals (DS1–DS3) forming a VT-level signal, wherein the multiplexing unit 107 produces the VT-level multiplex signal in response to the VT-level signals supplied thereto from the mapping unit 108 and sends the VT-level multiplex signal to the VT-level cross connect switch 103 for insertion to the ring network. Further, the channel CH1 includes a VT-level path switch 109 connected to the cross connect switch 103 for selecting one of the east side path ES and the west side path WS, and a demapping unit 110 for converting the VT-level signal to the DSn signal, wherein the demapping unit 110 branches the VT-level signal from VT-level path on the cross connect switch 103 via the VT-path switch 109.

In operation, the signals are transmitted between the nodes D and J in the form of the DS1 signal having a transmission rate of 1.544 Mbps or the DS2 signal having a transmission rate of 6.312 Mbps, wherein the signal thus transmitted is converted, in the mapping unit 108, to form a VT-level signal that may have the transmission rate of any of 1.7 Mbps, 3.4 Mbps and 6.9 Mbps. Thereby, the cross connection is achieved in the cross connection unit 103 in the VT-level. Further, it should be noted that the VT-level path switch unit 109 has a construction to switch the side, when a VT-level alarm indication signal VT-AIS has been issued, from the defective side to the defect-fee side.

In the foregoing conventional example, the composite ring network has been constructed by connecting the two ring networks 86a and 86b each carrying signals of the same signal level or format. On the other hand, it is also possible to construct a composite ring network by connecting a plurality of ring networks in which the signal format is different. For example, FIG. 4 shows a case of conventional composite ring network wherein ring networks of different signal formats are connected with each other.

Referring to FIG. 4, the composite ring network includes a number of nodes 124A–124J each including a path switch 121, wherein the path switch 121 connects the nodes with each other according to respective paths 125a and 125b to form respective ring networks 126a and 126b. Further, the ring networks 126a and 126b are connected with each other by conversion multiplexing units 127A and 127B.

In the first ring network 126a, a transmission is made of an optical signal of the OC-12 format having a transmission rate of 600 Mbps or an optical signal of the OC-48 format having a transmission rate of 2.4 Gbps, through the nodes 124A–124B, and the path switch unit 121 of the reception side node selects one of the two paths that provides a better transmission quality for the STS-1 level signals, based upon the STS-1 signal received and separated by the cross connection switch not illustrated in FIG. 4. Further, the second ring network 126b transmits the optical signal of the OC-3 format between the nodes 124A and 124J with a transmission rate of 150 Mbps, and the path switch unit 121 selects the path having a better quality based upon the signal that has been separated by the cross connection switch not illustrated.

It should be noted that the conversion multiplexing unit 127A is provided between the nodes 124C and 124F and achieves a conversion between the STS-level signals and the DS1-level signals, while the conversion multiplexing unit 127B is provided between the nodes 124D and 124J and achieves a conversion between the STS-level signals and the DS1-level signals.

The output signal of the node 124A is sent out from the node 124A in two directions along both paths 129a and 129b represented by a one-dotted chain, while the foregoing conversion multiplexing units 127A and 127B achieve a conversion of the STS-level signal, which is inserted to and/or branched from the ring network 126a at the nodes included therein, to the DS1-level signal which is inserted to or branched from the ring network 126b at a corresponding node. Further, the path switch unit 121 of the node 124H selects one of the paths 129a and 129b that has a better signal quality. Further, the signals from the node 124H to the node 124A are also transmitted in two directions along both paths 128a and 128b, wherein the path switch 121 of the node A is used to select the path that provides a better signal quality.

In such a conventional composite ring network, an alarm indication signal AIS is generally issued upon occurrence of failure, with a signal level corresponding to the site where the failure has occurred. For example, when a failure occurred in the path 87b that connects the node A to the node H in the system of FIG. 1, the reception side node H switches the path from the path 87b to the path 87a by causing a switching of the path switch 81 therein in response to the alarm indication signal, and telecommunication between the node A and the node H is maintained.

Further, when there occurred a failure in the path that connects the ring networks 86a and 86b together as shown in FIG. 1, which shows a case in which a failure has occurred between the nodes D and J, the channel 82 of the node J detects the disconnection of the DS3-level path and issues an alarm indication signal DS3-AIS of the DS3 level. This alarm indication signal DS3-AIS is then forwarded to the node H via the node I.

Here, it should be noted that the path switch 81 in the nodes A–J achieves the switching only in the STS-level. Thus, when an alarm indication signal of the STS-level designated as STS-AIS is detected, the path switch 81 is activated and causes a switching of the path from the path from which the STS-AIS signal has been transmitted, to the other, defect-free path.

On the other hand, when the DS3-level alarm, DS3-AIS, has been transmitted to the node H via the nodes J and I, as in the case of FIG. 1, the path switch 81 of the node H merely forwards the DS3-level alarm indication signal to the reception side, irrespective of the contents thereof. In other words, there occurs no switching in the path switch 81 in response the DS3-AIS signal which is a non-STS-level alarm indication signal. Thus, in the event the path switch 81 has selected the side of the node I initially, there occurs no switching to the normal path 87a even when there occurs a disconnection of the path 87b and the alarm DS3-AIS has been issued. Thereby, the restoration of the network is not possible.

A similar problem occurs also when the nodes D and J are connected by the signal of any of the DS1, DS1C and the DS2 levels. In such a case, the failure occurred between the nodes D and J results in a generation of an alarm indication signal Dn-AIS of the Dn-level in response to the disconnection of the Dn signal, wherein Dn represents the level Dn (DS1, DS1C, DS2) of the connection. As the path switch 81 responds only to the alarm indication signal VT-AIS of the VT-level, the path switch 81 does not respond to the foregoing alarm indication signal Dn-AIS of the Dn level. The path switch 81 thereby merely forwards the signal Dn-AIS, upon reception of the same by the node H, to the next node. Thus, as long as the path switch 81 selects the node I initially, there occurs no switching of the path to the node G. In other words, the communication path is lost and not restored.

In the conventional composite ring network of FIG. 4, it should be noted that the node 124C issues an alarm indication signal STS-AIS in response to the detection of disconnection of the STS-level signal, upon occurrence of a failure at a site a between the conversion multiplexing unit 127A and the node 124C. In response to this, the path switch 121 of a node such as the node 124A that has received the foregoing alarm indication signal STS-AIS, causes a switching from the path 128a to the path 128b, and one can maintain the communication between the nodes 124A and 124H via the defect-free path 128b that avoids the defective site a.

It should be noted, however, that the conversion multiplexing unit 127A issues the alarm indication signal DS1-AIS of the DS1 level to the node 124F, upon the detection of disconnection of the STS-level signal, while the alarm indication signal DS1-AIS of the DS1-level thus produced is multiplexed, in the node 124F, and sent out on the transmission path 125b. Thereby, the path switch 121 of the node 124H, which is designed to cause the switching of the path upon detection of the alarm indication signal of the synchronous system, such as the STS-level signal or the VT-level signal, merely forwards the DS1-level alarm indication signal DS1-AIS to the next node, and there occurs no switching of the path switch 121 as long as it is switched initially to the node 124G, even in the event of failure at the site a between the nodes 124C and 124F. Thus, the switching to the node 124I does not occur and the communication path is lost.

Furthermore, the failure of the DS1-level between the conversion multiplexing unit 127A and the node 124F results in a generation of the DS1-level alarm indication signal in the node 124F, wherein the node 124F transmits the same with a multiplexing. Thus, similarly to the foregoing case, the path switching is not possible in the node H upon the occurrence of the failure. As the conversion multiplexing unit 127A transmits the DS1-level alarm indication signal DS1-AIS to the node 124C in the state that the signal DS1-AIS is inserted to the STS-level signal upon detection of the DS1 signal, the path switch 121 of the node A that receives the foregoing alarm indication signal DS1-AIS via the node 124B does not cause the switching even when there occurs a real failure at the site a of the network. In other words, the system of FIG. 4 cannot restore the communication path.

SUMMARY OF THE INVENTION

Accordingly, it is a general object of the present invention to provide a novel and useful composite ring network wherein the foregoing problems are eliminated.

Another and more specific object of the present invention is to provide a composite ring network that is formed of a plurality of ring networks coupled with each other by an interconnection path, wherein the composite network is capable of restoring communication upon occurrence of failure in the interconnection path.

Another object of the present invention is to provide a composite ring network, comprising:

a plurality of ring networks each including a plurality of nodes;

each of said nodes having first and second paths extending therefrom for carrying an information signal, said first and second paths being connected to other nodes of said ring network, each of said nodes comprising:
a cross connect switch connected to said first and second paths for establishing a cross connection therebetween;
a channel part connected to said cross connect switch for sending a signal on both of said first and second paths simultaneously via said cross connect switch and for selectively receiving an information signal from one of said first and second paths via said cross switch, said channel part including a path switch for selecting one of said first and second paths;

two of said ring networks being connected with each other at a pair of nodes, one of said two nodes being included in a first ring network and the other being included in a second ring network, by a connection path;

each of said plurality of nodes including an alarm generation unit for generating a failure signal, when a failure has occurred in said connection path, with a such format that said failure signal can be detected by said nodes forming said plurality of ring networks;

said path switch of said nodes selecting, in response to said failure signal supplied thereto via one of said first and second paths, a path other than said path that has carried said failure signal.

According to the present invention, the failure signal produced by the node that has detected a failure in the foregoing connection path is issued in the form that is detectable by the nodes forming the ring networks. As a result, the node that has detected the alarm switches the path to select a defect-free path, and the communication is maintained successfully. In a typical example, the connection path carries an asynchronous signal in the DSn level, while the ring networks carry a synchronous signal in the STS-level. Thus, the failure occurred in the connection path results in the generation of the failure signal in the node that has detected the failure as usual, wherein the node issues this failure signal in the STS-level in the case of the present invention. Thereby, the node on the network can recognize the alarm and successfully switches the path in response thereto.

Another object of the present invention is to provide a composite ring network, comprising:

first and second ring networks each including a plurality of nodes;

each of said nodes having first and second paths extending therefrom for carrying a multiplex signal, said first and second paths being connected to other nodes of said ring network, each of said nodes comprising:
a cross connect switch connected to said first and second paths for establishing a cross connection therebetween;
a channel part connected to said cross connect switch for sending a signal on both of said first and second paths simultaneously via said cross connect switch and for selectively receiving an information signal from one of said first and second paths via said cross connect switch, said channel part including a path switch for selecting one of said first and second paths;

said first ring carrying signals with a first signal format;
said second ring carrying signals with a second, different format;
said first and second ring networks being connected with each other at a pair of nodes, one of said pair of nodes being included in said first ring network and the other being included in said second ring network, by a connection path;

said connection path receiving a first signal from said first ring network with said first signal format for sending a second signal to said second ring network with said second signal format, by converting the signal format of said first signal from said first signal format to said second signal format, said connection path receiving a third signal from said second ring network with said second signal format for sending a fourth signal on said first ring network with said first signal format, by converting the signal format of said third signal from said second signal format to said first signal format;

wherein said connection path includes a converter for converting the signal format of a failure signal, which is issued in said connection path upon a failure in said connection path, to said first signal format and sending said failure signal thus converted to said first ring network, said connection path converts the signal format of said failure signal to said second signal format and sending said failure signal thus converted to said second ring network, such that said path switch of said nodes is activated in response to said failure signal to select one of said first and second paths in response thereto.

According to the present invention, it is possible to convert the signal format of the failure signal produced in the connection path to a format compatible to the ring network to which the failure signal is to be directed. Thereby, the node forming the ring network detects the failure signal and switches the path to a redundant defect-free path.

Other objects and further features of the present invention will become apparent from the following detailed description when read in conjunction with the attached drawings.

DETAILED DESCRIPTION OF PREFERRED EMBODIMENTS

Figure 5:
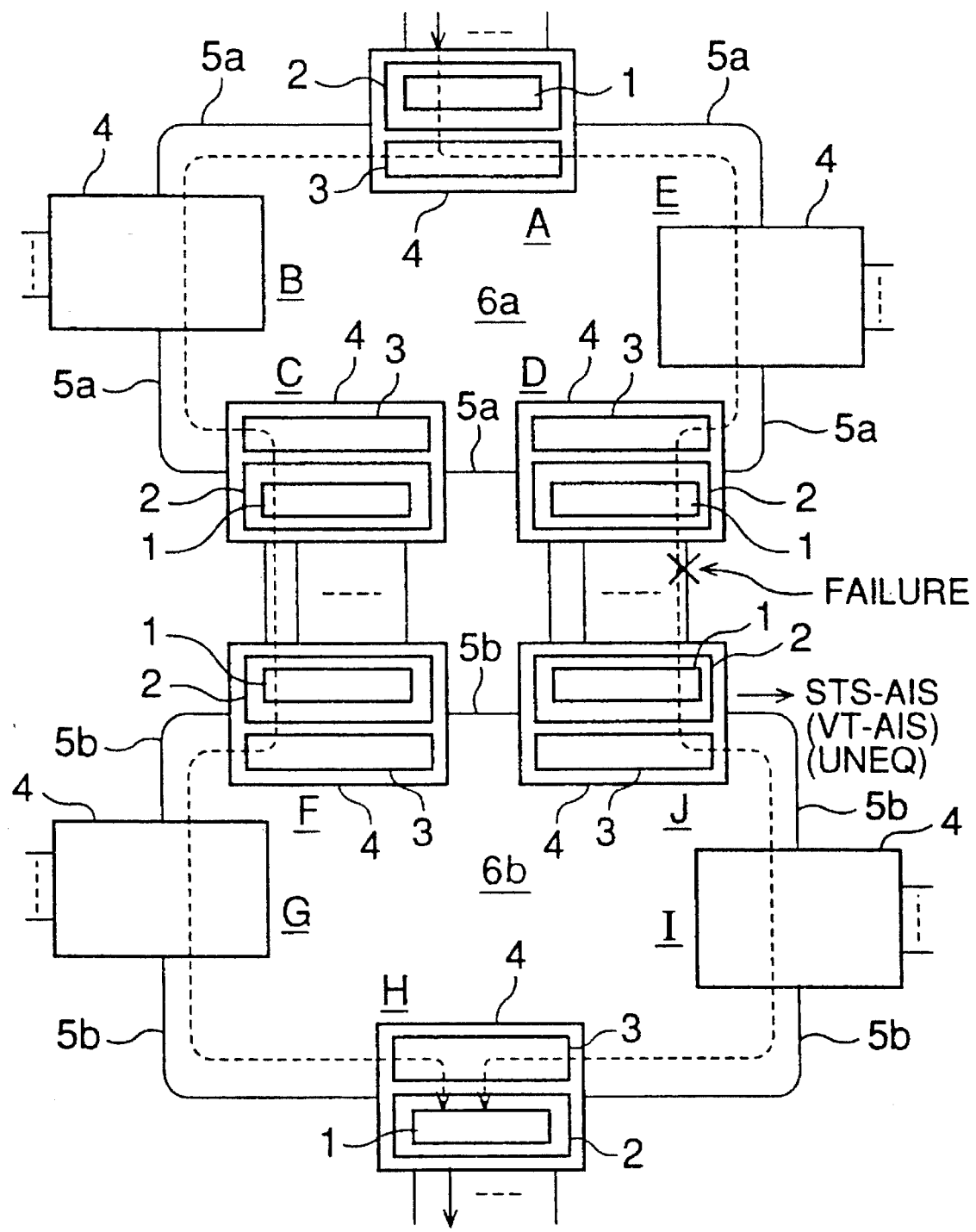
FIG. 5 is a diagram showing the principle of the present invention.

First, the principle of the present invention will be described with reference to FIG. 5 showing a composite ring network.

Referring to FIG. 5, the composite ring network is formed of a plurality of ring networks 6a and 6b each including a plurality of nodes 4. Each of the nodes 4 has first and second paths extending therefrom, wherein the foregoing first and second paths are connected to other nodes 4 of the ring network 6a or 6b to form transmission paths 5a and 5b that carry a multiplex signal.

It should be noted that each of the nodes 4 includes a cross connect switch 3 supplied with a first multiplex signal from the first path for extracting a plurality of signal components therefrom, for producing a second multiplex signal by multiplexing the plurality of signal components after a cross connection. The second multiplex signal thus produced is sent out on the second path. Further, the node 4 includes a channel part 2 connected to the cross connect switch 3 for sending a signal on both of the foregoing first and second paths simultaneously via the cross connect switch 3 and for selectively receiving a signal from one of the first and second paths via the cross connect switch 3. The channel part 2 thereby includes a path switch 1 for selecting one of the foregoing first and second paths.

In the construction of FIG. 5, the ring networks 6a and 6b are connected with each other at a pair of nodes 4, one being included in the first ring network 6a and the other included in the second ring network 6b, by way of a connection path. Further, each of the plurality of nodes 4 includes an alarm generation unit for generating a failure signal STS-AIS of the STS-level or a failure signal VT-AIS of the VT-level, when a failure has occurred in the connection path. Thus, the alarm generation unit produces the failure signal with a such format that the failure signal can be detected by the nodes 4 that form the ring networks 6a and 6b. As a result, the path switch 1 of the nodes 4 selects, in response to the failure signal supplied thereto via one of the first and second paths, a path other than the path that has carried the failure signal for restoring communication.

The channel part 2 and the cross connect switch 3 are connected by a communication path of the STS or VT-level in each of the nodes 4, while the nodes 4 that are used for connecting the two ring networks 6a and 6b are connected with each other by a DSn (n=1, 2, 3) level communication path. Thus, the DSn-level path connects the nodes 4 with each other at the respective channel parts 2.

In each of the nodes 4, the path switch 1 has a construction to switch the path from the first path to the second path or from the second path to the first path, when a failure signal of the STS-level or VT-level is detected. When such a failure signal is detected, the path switch 1 switches the communication path from the side in which the failure signal is detected, to the side that is free from defects.

It should be noted that the channel part 2 sends an alarm indication signal AIS indicative of the disconnection of communication or a connection setup signal UNEQ specifying unused paths in the cross connection, to other nodes 4, upon occurrence of the failure, as the foregoing failure signal, with a signal level used for communication between the cross connect switch 3 and the channel part 2.

Alternatively one may construct the composite ring network such that the composite ring network includes the first and second ring networks 6a and 6b similarly as before, with the nodes 4 each formed of the cross connect switch 3 and the channel part 2, wherein the first ring network 6a supports the communication with a first signal format pertinent to the ring network 6a, while the second ring network 6b supports the communication with a second, different signal format pertinent to the ring network 6b. The ring networks 6a and 6b are connected with each other by a connection path such that the connection path receives a signal from the first ring network 6a with the first signal format and sending a converted signal to the second ring network 6b with the second signal format, by converting the signal format from the first signal format to said the signal format, or vice versa.

In this case, the connection path includes a converter for converting the signal format of a failure signal, which is issued in the connection path upon a failure occurred somewhere in the connection path, to the first signal format and for sending an alarm indication signal STS-AIS thus converted to the first ring network 6a as the failure signal. Alternatively, the connection path converts the signal format of the failure signal to the second signal format and sends out an alarm indication signal VT-AIS thus converted to the second ring network 6b as the failure signal. As a result, the path switch of the node 4 is activated in response to the failure signal and the selection of the defect-free path is made.

In the first ring network 6a, the path switch 1 of the node 4 may have a construction to conduct a path switching at the STS-level, while the path switch 1 of the second ring network 6b may have a construction to conduct a path switching at the VT-level. In this case, the converter in the connection path establishes a connection with the corresponding node 4 of the first ring network 6a at the STS-level. Further, the converter establishes a connection with the corresponding node 5 of the second ring network 6b at the VT-level. Thus, the converter converts the signal format of the STS-level alarm indication signal STS-AIS to the VT-level and sends out the VT-AIS signal thus produced on the second ring network 76b as the failure signal. Further, the converter converts the signal format of the VT-level alarm indication signal VT-SIS to the STS-level and sends out the STS-AIS signal thus produced on the first ring network 76a.

Typically, the transmission paths 5a and 5b of the ring networks 6a and 6b are formed of optical fibers, wherein the first network 6a carries an optical signal on which a number of STS signals are multiplexed, while the second network 6b carries an optical signal on which a number of VT signals are multiplexed.

In any of the above constructions, it is possible to set a communication path extending from a node in the first ring network 6a to a node in the second ring network 6b in such a composite ring network. For example, it is possible to set a communication path between the node A of the ring network 6a and the node H of the ring network 6b, wherein such a communication path includes the nodes B–E of the network 6a and the nodes F, G, I and J of the network 6b, in addition to the foregoing nodes A and H. It should be noted the node A transmits a signal in the directions to the node B and simultaneously in the direction to the node E, while the node H receives the same signal from any one of the node G and node I. As a result, the node C of the network 6a is connected to the node F of the network 6b via a communication path of the asynchronous DSn level signals (DSn=DS1, DS1C, DS2, DS2). Similarly, the node D of the network 6a is connected to the node J of the network 6b via a communication path of the foregoing DSn level signals. More specifically, the communication path connects the channel part 2 of the node C to the channel part 2 of the node F. Similarly, the channel part 2 of the node D is connected to the channel part 2 of the node J.

In such a state of the network, the failure occurred for example at the site X of FIG. 5 results in a transmission of the failure signal from the channel part 2 of the node J, with a signal level used for communication between the nodes. Thereby, the path switch part 2 of the node H detects the failure signal and causes a switching of the path from the one connected to the node I to the one connected to the node G. Thus, the communication is maintained even in the event of failure occurred in the communication path for signals having a signal format different from the signal format used in the ring network.

In the example where the path switch 1 is constructed for detecting a STS-level failure signal, it will be noted that the path switch 1 of the node J (or F) transmits an alarm indication signal STS-AIS as the failure signal, even in the event that the failure has occurred in the path for the Dn level signals between the nodes C and F or between the nodes D and J. When the path switch 1 has a construction to detect a VT-level failure signal, on the other hand, the path switch of the node J (or F) transmits an alarm indication signal VT-AIS of the VT-level as the failure signal, even in the event that the failure has occurred in the path for the Dn level signals between the nodes C and F or between the nodes D and J. Thus, the path switch 1 of the reception side node H always selects the redundant path, and it is possible to avoid the overall failure of the composite ring network.

In the present invention, it is possible to use an out-of-use signal UNEQ indicative of the unused path in addition to the alarm indication signal AIS for the failure signal, wherein the out-of-use signal UNEQ is normally transmitted from the cross connect switch 3 to those paths that are not cross connected for setting up ring network. In this case, too, the AIS signal or the UNEQ signal is transmitted with a signal level that can be detected by the path switch 1 of the nodes 4.

Further, the foregoing principle of the present invention is also effective in the composite ring networks wherein the signal format is different between the first ring network and the second ring network connected with each other. In such a composite ring network, there is provided a multiplexing converter in the connection path for connecting the first and second ring networks 6a and 6b such that the signal formats of the first and second ring networks are converted to each other. Thus, when a failure develops in the path between the converter and the node D of the first ring network 6a, the converter transmits the failure signal to the nodes of the second ring network 6b with the signal level such that the path switch 1 of the nodes 4 of the second ring network 6b responds thereto. In the event a failure develops in the path between the converter and the node J of the second ring network 6b, the converter transmits the failure signal to the nodes of the first ring network 6a, with the signal level of the first ring network 6a, such that the path switch 1 of the nodes in the first ring network 6a can detect the failure signal. As a result, the path switch 1 of the reception side node H of the ring network 6b causes a switching of the reception path, in response to the failure signal, from the first path connected to the node I to the second path connected to the node G.

In a typical example where the first ring network 6a carries synchronous signals in the STS-level such as the STS-1 level that provides a transmission rate of 51.84 Mbps, the path switch 1 of the node 4 therein also respond to the signals of the STS-1 level. Further, the second ring network 6b may carry different synchronous signals in the VT-level having a transmission rate of 1.754 Mbps. Thus, the path switch 1 of the node 4 achieves a path switching in response to the signals of the VT-level. The network 6a and the network 6b are connected with each other by a conversion multiplexing unit, wherein the conversion multiplexing unit is connected to the node F of the ring network 6b by a connection path of the VT-level on the one hand and to the node C of the ring network 6a by a connection path of the STS-level on the other hand, and achieves a conversion of the signal format from the VT-level to the STS-level and from the STS-level to the VT-level.

Thus, the conversion multiplexing unit converts the STS-level alarm indication signal STS-AIS, issued in response to the disconnection of the STS-level signals, to the VT-level alarm indication signal VT-AIS and sends the same on the ring network 6b. In response thereto, the path switch 1 of the node H causes a switching to the normal path upon the VT-AIS signal thus supplied. Similarly, the conversion multiplexing unit converts the VT-level alarm indication signal VT-AIS to the STS-level signal STS-AIS when sending a transmission from the node H to the node A. As a result, the path switch 1 of the node A switches the path to the defect-free path upon detection of the STS-AIS signal.

Further, one may construct the first ring network 6a to carry the multiplex optical signals such as the OC-48 signal having a transmission rate of 2.4 Gbps or the OC-12 signal having a transmission rate of 600 Mbps, by multiplexing the STS-level signals. Alternatively, it is possible to construct the second ring network 6b to carry the OC-3 signals of 150 Mbps transmission rate, wherein the OC-3 signals are produced by mapping the DS1 signals to the VT-level. The mapping herein means addition of overhead to the signals and synchronization. The conversion multiplexing unit thereby achieves a conversion of the signal level from the STS-level used between the nodes C and F or between the nodes D and J, to the VT signal level in which the DS1 signals are mapped, or vice versa.

Figure 6:
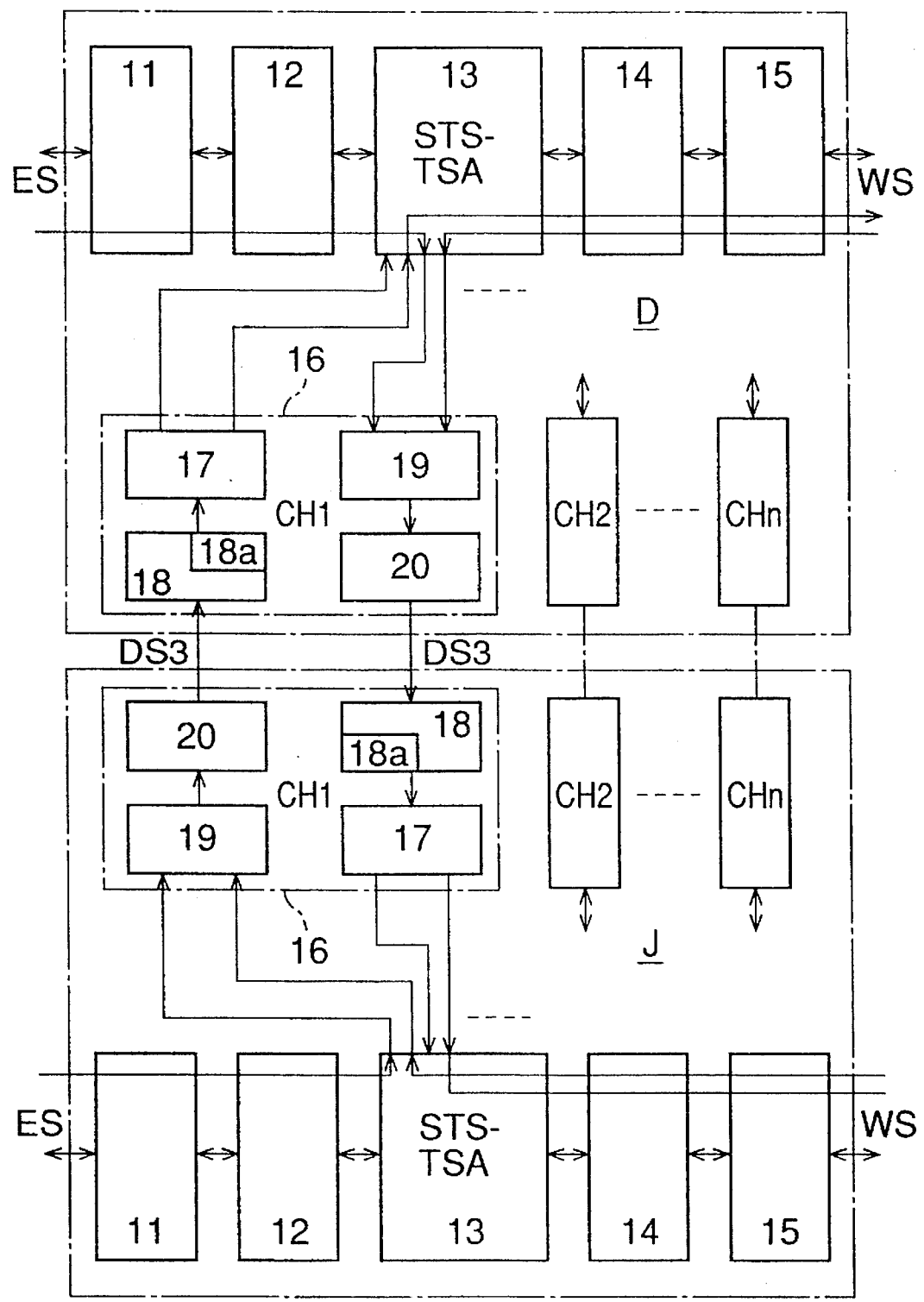
FIG. 6 is a diagram showing the construction of a composite ring network according to a first embodiment of the present invention.

Hereinafter, a first embodiment of the present invention will be described with reference to FIG. 6, wherein FIG. 6 shows the essential part of the nodes D and J of the construction of FIG. 5 for the case of conducting a cross connection at the STS-level at the transmission rate of about 50 Mbps.

Referring to FIG. 6, each of the nodes D and J includes conversion units 11 and 15 for converting optical signals received from other nodes on the ring network to respective electric signals, and for converting electric signals to respective optical signals, wherein the optical signals thus produced are transmitted to other nodes on the ring network. Thus, the conversion units 11 and 15 includes photoelectric conversion means such as photodiode and laser diode. The conversion units 11 and 15 are connected to respective multiplexing units 12 and 14 for conducting multiplexing and demultiplexing of signals supplied to and from the conversion units 11 and 15, wherein the multiplexing units 12 and 14 are connected with each other by a cross connect switch 13 (STS-TSA) that conducts a cross connection of the time-slot in the STS-level.

Further, a channel part 16 including channels CH1, CH2, . . . CHn are connected to the foregoing cross connect switch 13 for branching and/or inserting signals to and from the STS-level path therein. Each of the channels such as the channel CH1 includes a multiplexing unit 17 for conducting multiplexing of the STS-level signals and a mapping unit 18 for mapping or converting the a DS3 signal having a transmission rate of 44.736 Mbps to the STS signal, wherein the mapping includes process steps such as insertion of signal overhead and signal synchronization as explained before.

In the present embodiment, it should be noted that the mapping unit 18 includes a conversion unit 18a for converting the failure signal indicative of occurrence of failure in the network from the DSn level to the STS-level. Further, the channel CH1 includes an STS-level path switch 19 for selecting one of east side path ES extending from the conversion unit 11 to an adjacent node such as the node C and west side path WS extending from the conversion unit 15 to an adjacent node such as the node E, when the current node is the node D. When in the node J, the east side path ES is connected to the node F and the west side path WS is connected to the node I. See the construction of FIG. 5. The STS signal on the selected path selected by the path switch 19 is then converted to the DS3 signal in a demapping unit 20.

In the illustrated example, the node D belonging to the ring network 6a and the node J belonging to the network 6b are connected with each other by the DS3 level signals. Further, the cross connect switch 13 of the node D forms an STS path between the multiplexing unit 17 and the west side STS path WS, and inserts an STS-level signal supplied thereto to the STS signals transmitted to the node E. In this case, no STS path is formed between the multiplexing unit 17 and the east side STS path ES connected to the node C. Further, the STS path switch 19 selects one of the west side path WS and the east side path ES for receiving the STS signals, based upon the quality of the STS signals separated by the cross connect switch 13.

In the node J, too, the cross connect switch 13 forms an STS path between the multiplexing unit 17 and the west side WS connected to the node I, for inserting STS signals to the signals directed to the node I. On the other hand, no STS path is established between the multiplexing unit 17 and the east side path ES connected to the node C. It should be noted that the STS path switch 19 selects, also in the node J, one of the paths ES and WS that provides a better quality of reception signals. It should be noted that the path switch 19 of each node maintains the initial selection of the path until a failure signal is detected.

Figure 1:
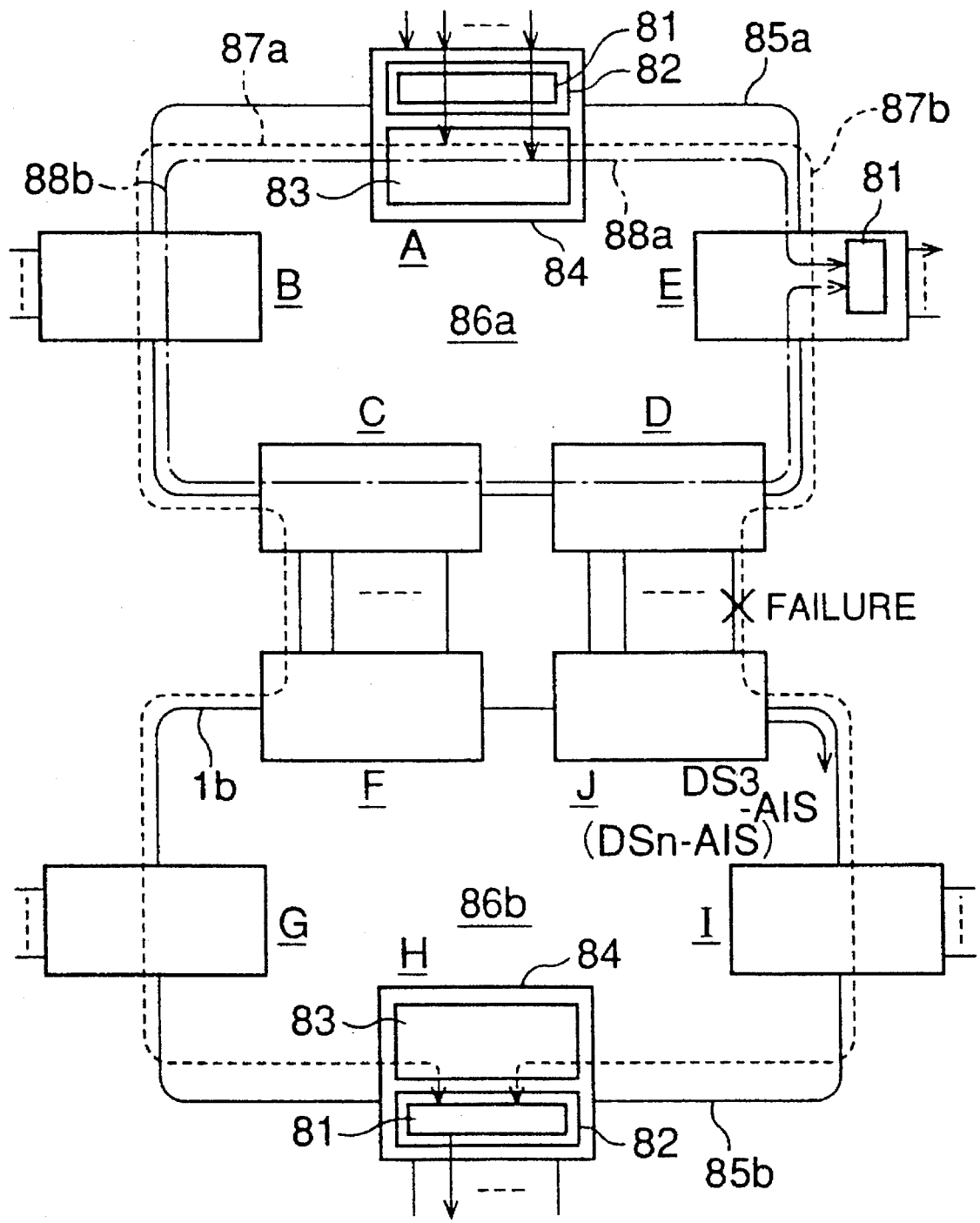
FIG. 1 is a diagram showing the construction of a conventional composite ring network.
Figure 2:
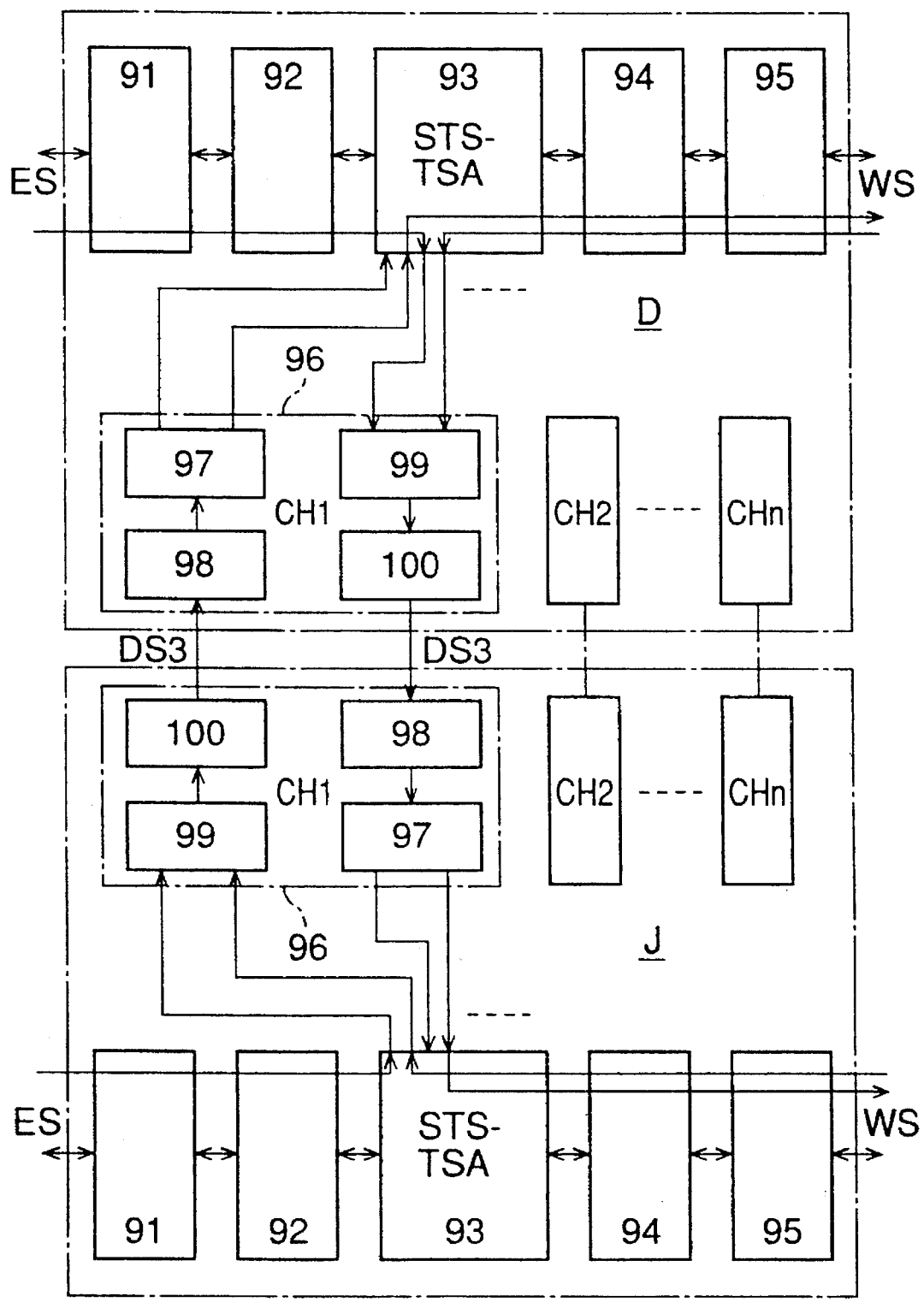
FIG. 2 is a diagram showing an example of the construction of node used in the conventional ring network of FIG. 1.

Thus, the present embodiment has a construction similar to that of the conventional system shown in FIG. 2, while it will be noted that there is a distinction in the point that the present embodiment uses the conversion unit 18a in the channel part 16 for converting failure signal. It should be noted that the channel part 16 has a capability of sending the alarm indication signal DS3-AIS of the DS3 level as a failure signal upon occurrence of a failure in the path for the DS3-level signals. Thereby, the conversion unit 18a converts the DS3-level alarm indication signal DS3-AIS to the STS-level alarm signal. Further, it should be noted that the cross connect switch 13 sends out an out-of-use signal STS-UNEQ indicative of unused STS path to the unused STS paths in the STS-level. Thus, the conversion unit 18a may also convert the foregoing signal DS3-AIS of the DS3 level to the out-of-use signal STS-UNEQ.

When a failure has occurred in the DS3-level at the site X between the mapping unit 18 of the node D and the demapping unit 20 of the mode J, the channel part 16 of the node D detects the loss of the DS3 signals from the corresponding channel part 16 of the node J and issues a DS3 level alarm indication signal DS3-AIS, wherein the alarm indication signal DS3-AIS is then converted to the STS-level alarm indication signal STS-AIS by the conversion unit 18a. Alternatively, the conversion unit 18a may convert the alarm indication signal DS3-AIS to the STS-level out-of-use signal STS-UNEQ. Further, it is also possible to construct the channel part 16 such that the channel part 16 sends out the STS-level failure signal STS-AIS directly upon detection of loss of the DS3 level signals. The STS-level failure signal thus produced, including also the out-of-use signal UNEQ, is then sent out to the west side path WS via the cross connect switch 13.

When a loss of the DS3 signal is detected between the demapping unit 20 of the node D and the mapping unit 18 of the node J, on the other hand, the conversion unit 18a sends out the STS-level failure signal such as the alarm indication signal STS-AIS or the out-of-use signal STS-UNEQ, on the west side path WS connected to the node I, via the cross connect switch 13. The STS-level alarm indication signal STS-AIS or the out-of-use signal UNEQ is thereby transmitted to the node H via the node I.

Figure 8:
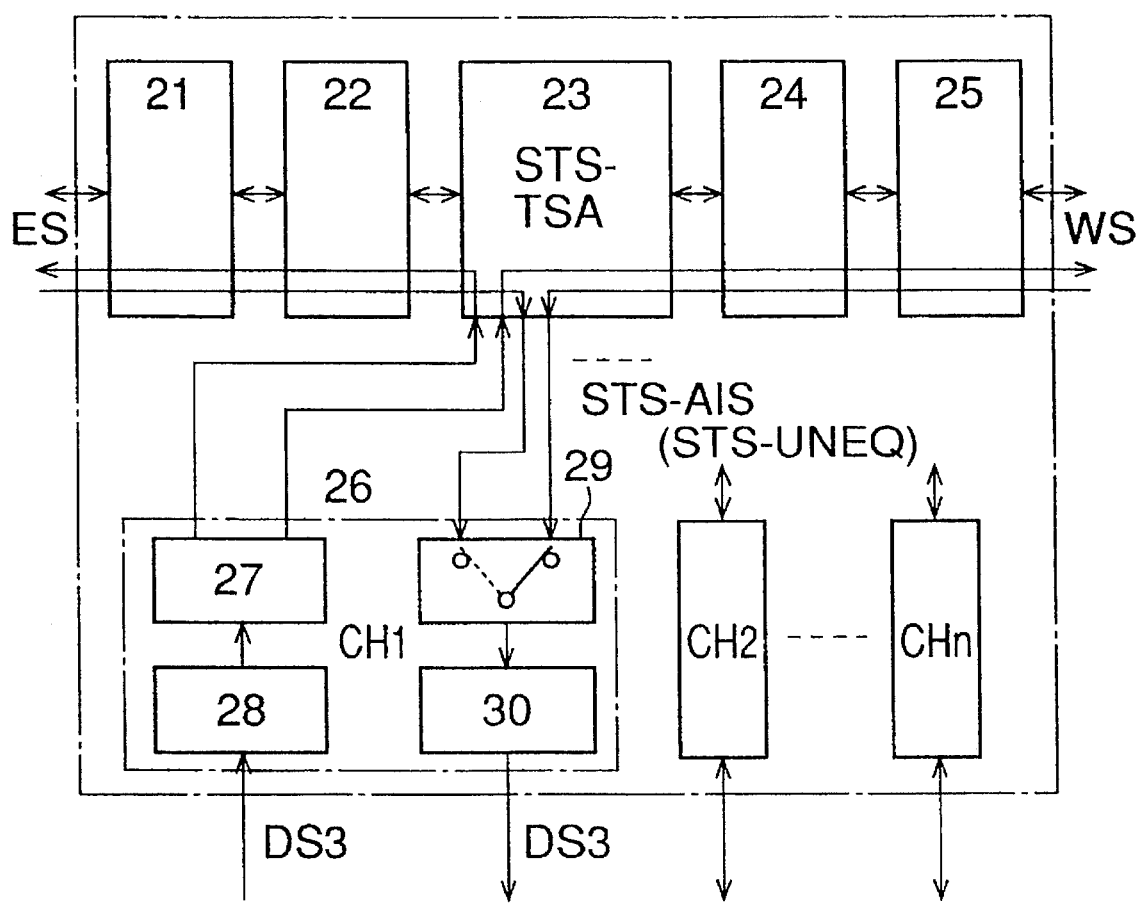
FIG. 8 is a diagram showing the construction of a reception side node used in the first embodiment.

FIG. 8 shows the essential part of the node H used in the composite ring network of FIG. 5 for receiving signals.

Figure 7:
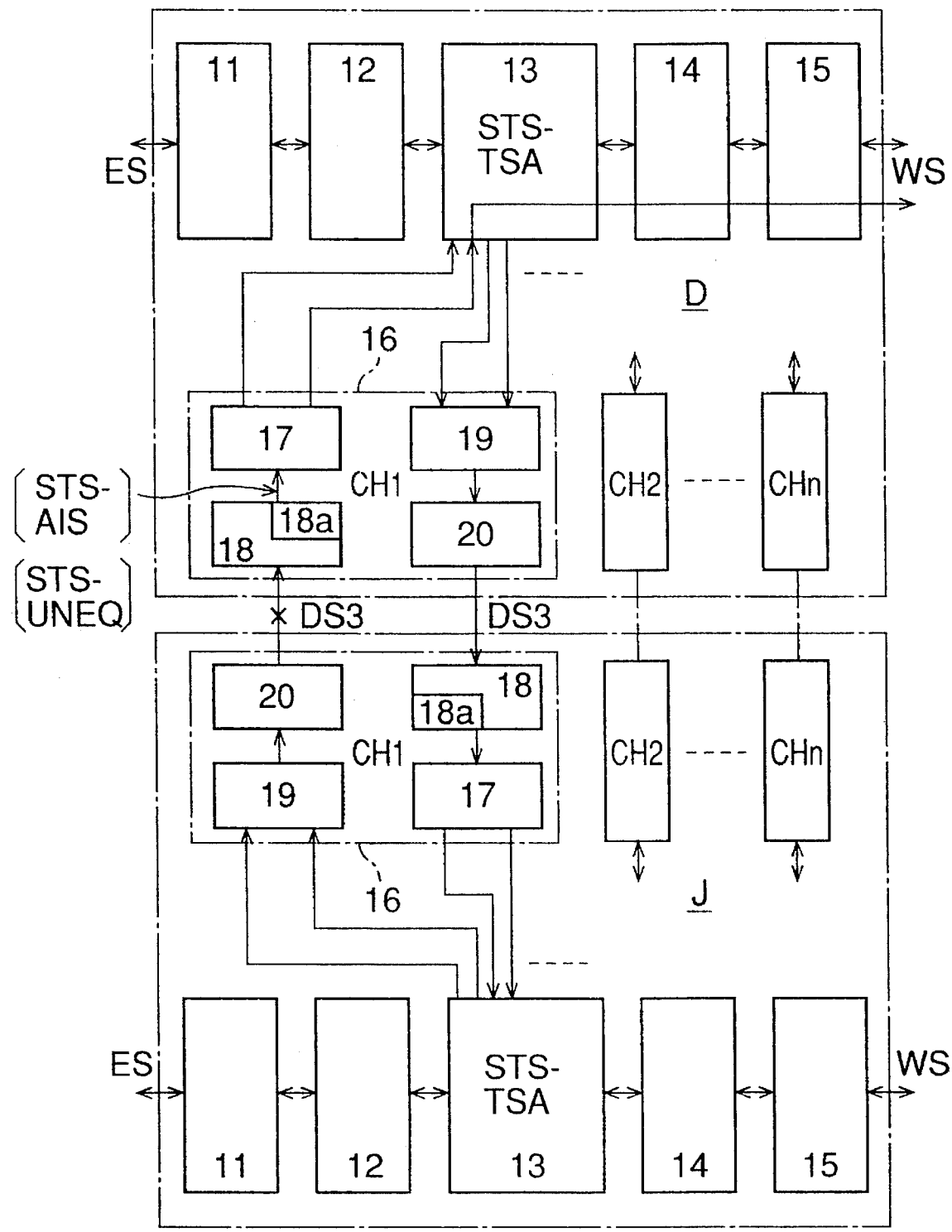
FIG. 7 is a diagram for explaining a failure occurred in the first embodiment.

Referring to FIG. 8, the node H includes photoelectric converters 21 and 25 for receiving optical signals from other nodes and for converting the received optical signals to electric signals. Further, each of the photoelectric converters 21 and 25 receives electric signals to be transmitted and converts the same to corresponding optical signals for transmission. The photoelectric converters 21 and 25 are connected to respective multiplexing units 22 and 24 for carrying out multiplexing and demultiplexing of the signals to be transmitted and received, wherein the multiplexing units 22 and 24 are connected to a cross connect switch 23 (STA-TSA) that carries out a cross connection of received signals and transmission signals by conducting an exchange of time-slots, similarly to the cross connect switch 13 of FIG. 7. Further, a number of channel parts 26 including channels CH1, CH2, . . . CHn) are connected to the cross connect switch 23, wherein each of the channel parts 26 includes a multiplexing unit 27 corresponding to the multiplexing unit 17, a mapping unit 28 corresponding to the mapping unit 18 and conducting a mapping of the DS3 signal to the STS signal, an STS-level path switch 29 corresponding to the path switch 19, and a demapping unit 30 corresponding to the demapping unit 20 for converting the STS-level signals to the DS3 level signals as a result of demapping.

It should be noted that the cross connect switch 23 and the channel 26 are connected with each other by a path for the STS-level signals, while the channel 26 and the node of the other network not illustrated in the drawings are connected with each other by the DS3 level signals. Thus, the path switch 29 of the channel 26 selects one of the east side path ES and the west side path WS, upon detection of the failure signal of the STS-level, such that a defect-free path is selected. In the event that the STS path switch 29 is originally set to receive the STS signals from the west side path WS connected to the node I, the STS path switch 29 switches the path, upon detection of the STS-level alarm indication signal STS-AIS, which is issued upon occurrence of a failure between the channel part 16 of the node J and the channel part 16 of the node D, such that the STS signals are received from the east side path ES connected to the node G as indicated by a broken line in FIG. 8. As a result, a normal reception is maintained.

Thus, in the ring network of FIG. 5, the occurrence of failure in the path between the nodes D and J for the DS3 level signals results in a transmission of a failure signal, such as the alarm indication signal STS-AIS or the out-of-use signal UNEQ, from the node J to the node H via the node I in the STS-level. Thus, the path switch 1 of the node H detects the STS-level failure signal and causes the switching of the path from the west side path WS to the node I to the east side path ES to the node G. As the path to the node G is free from defects, the signal from the node A is successfully and continuously received at the node H.

Figure 9:
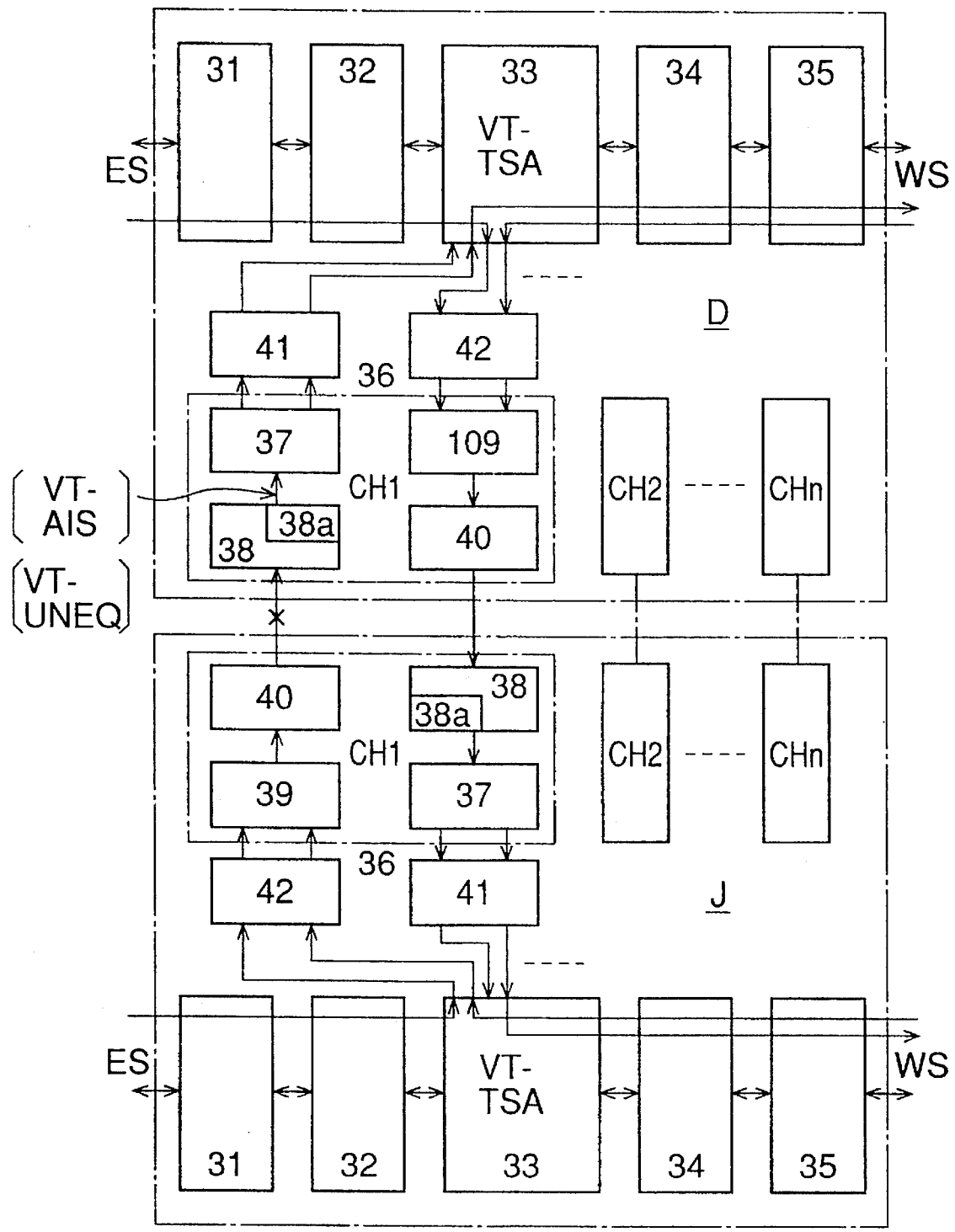
FIG. 9 is a diagram showing a second embodiment of the present invention.

FIG. 9 shows a second embodiment of the present invention, wherein the two ring networks 6a and 6b carry VT-level signals in the present embodiment.

Referring to FIG. 9 showing the essential part of the nodes D and J that connect the two ring networks 6a and 6b of FIG. 5, it will be noted that the VT-level signals are formed with a transmission rate of about 1.7 Mbps as a result of mapping of the DS1 level signals. Alternatively, the VT-level signals may have a transmission rate of about 3.4 Mbps as a result of mapping of the DS1C signals or a transmission rate of about 6.9 Mbps as a result of mapping of the DS2 signals.

In FIG. 9, there are provided photoelectric converters 31 and 35 corresponding to the foregoing photoelectric converters 11 and 15 in each of the nodes D and J, for photoelectric conversion of the reception signals and transmission signals. Similarly as before, the photoelectric converters 11 and 15 include a photodiode for optical reception and a laser diode for optical transmission. Further, there are provided multiplexing units 32 and 34 corresponding to the multiplexing units 12 and 14 for multiplexing transmission signal components and demultiplexing reception signal components, wherein the multiplexing units 32 and 34 supply the multiplex signal thus produced to respective photoelectric converters 31 and 35 for transmission on the respective ring networks, after photoelectric conversion. Further, the multiplexing units 32 and 34 cause a demultiplexing of the electric signals received by the photoelectric converters 31 and 35 of the node D or node J to respective signal components. Furthermore, there is provided a cross connect switch 33 corresponding to the cross connect switch 13 for carrying out exchange of the time-slots of the signal components in the VT signal level.

Similarly to the previous embodiments, a number of channel parts 36 are provided to cooperate with the cross connect switch 33 as indicated by channels CH1, CH2, ... CHn, wherein each of the channel parts such as CH1 includes a multiplexing unit 37 corresponding to the multiplexing unit 17, and a mapping unit 38 is provided in correspondence to the mapping unit 18 of the previous embodiment for mapping a DSn level signal such as the DS1 level signal having a transmission rate of 10.544 Mbps, the DS1C level signal having a transmission rate of 3.152 Mbps or the DS2 level signal having a transmission rate of 6.312 Mbps, to the VT signal level. It should be noted that the mapping unit 38 includes a conversion unit 38a corresponding to the converter 18a for converting the signal level of the failure signals of the DSn level to the VT-level. Further, there are provided a VT-level path switch 39 for switching the path of the VT-level signals, and a demapping unit 40 for converting the VT-level signals to the DS3 level signals.

It should be noted that each of the channel parts 36 is connected to the VT-level cross connect switch 33 via a multiplexing unit 41 used for inserting the signals of the channel CH1 to the VT-level signals on the ring network via the cross connect switch 33, and a demultiplexing unit 42 for branching the VT-level signals from the signals on the ring network via the cross connect switch 33.

Figure 3:
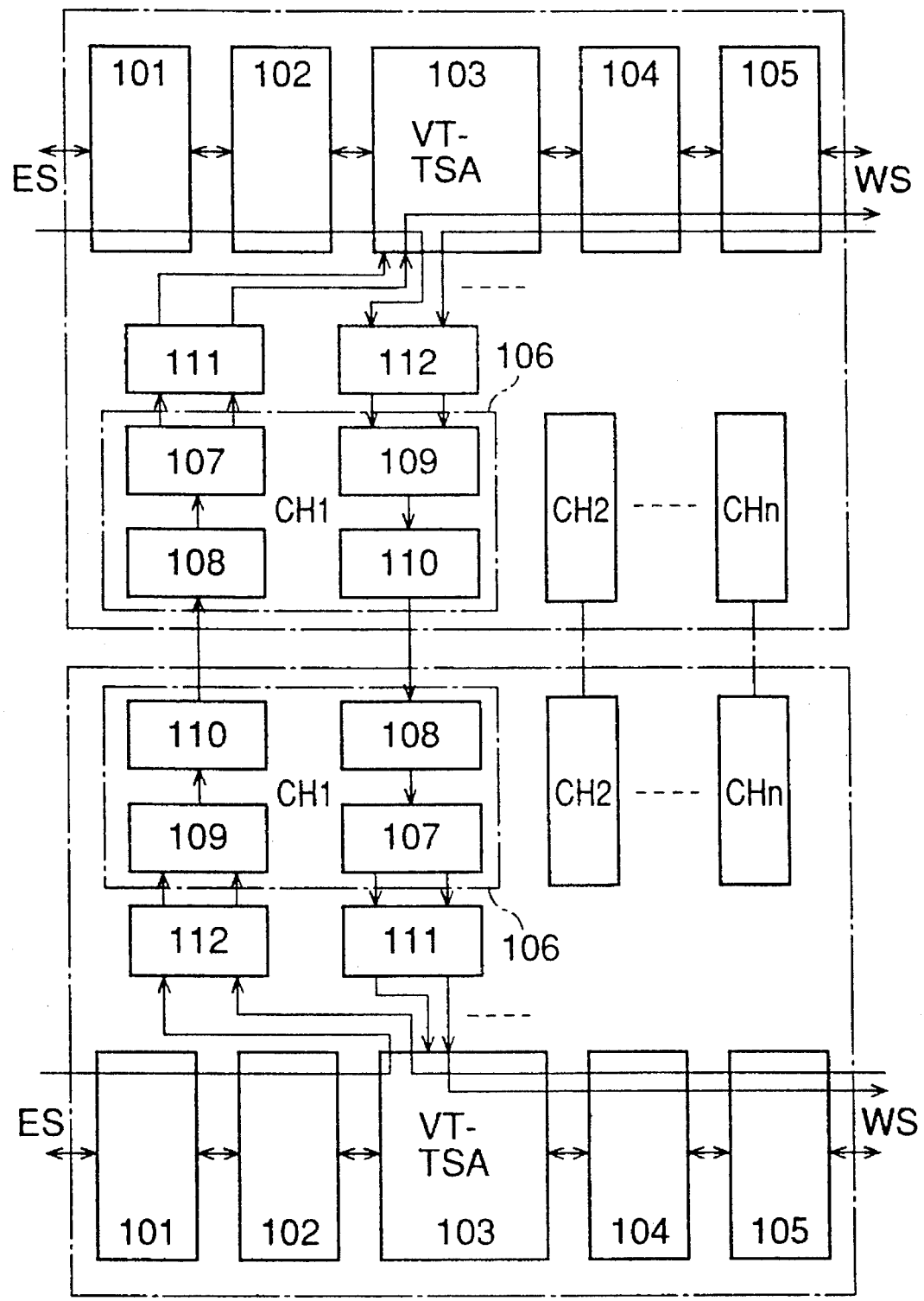
FIG. 3 is a diagram showing another example of the node used in the conventional ring network.
Figure 4:
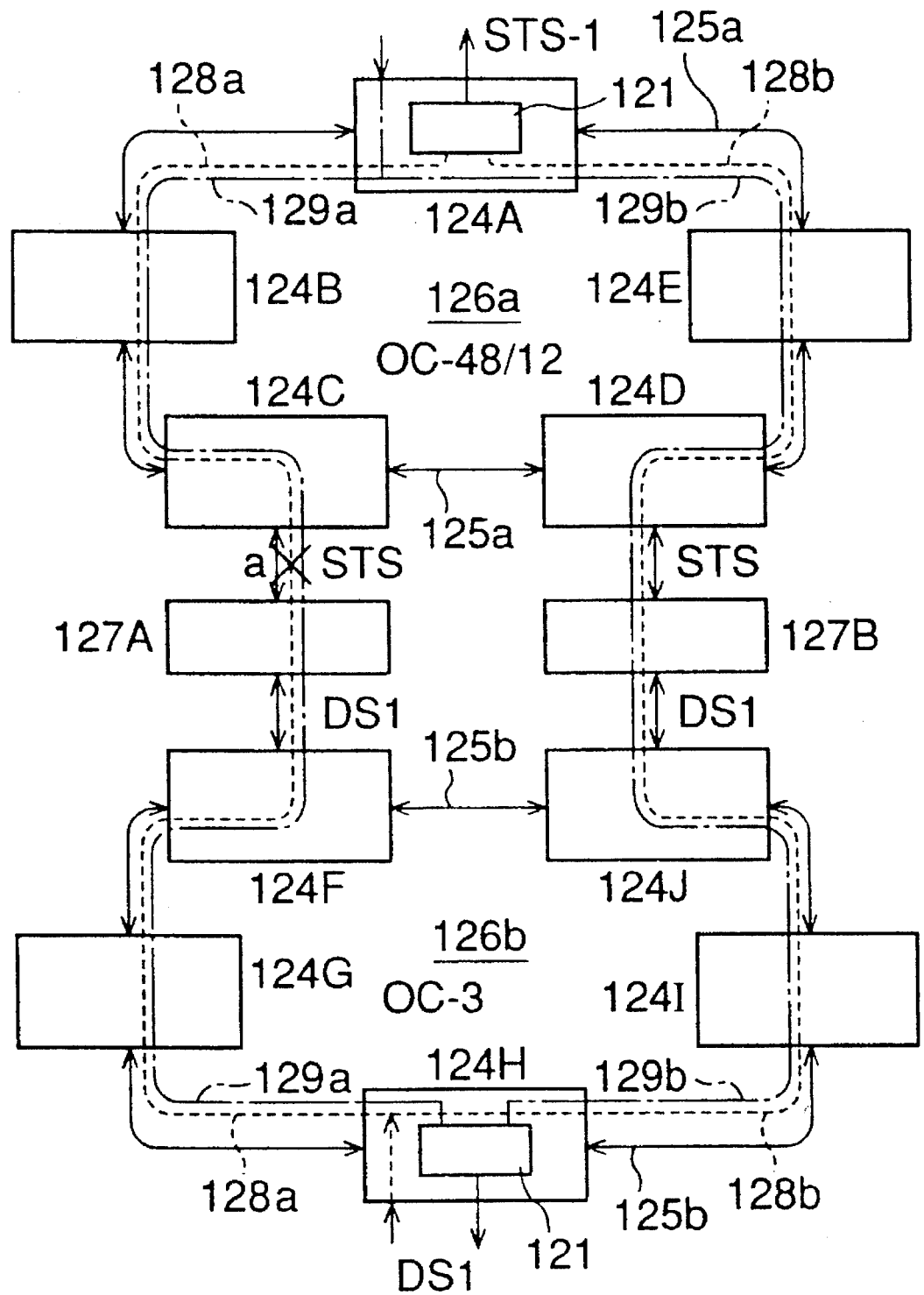
FIG. 4 is a diagram showing still other example of the node used in the conventional ring network.

The present embodiment is somewhat similar to the conventional construction of FIG. 3, while it will be noted that the system of the present embodiment employs the conversion unit 38a provided on the channel part 36. Thus, the channel part 36 is equipped with a capability of sending out a DSn level alarm indication signal DSn-AIS, upon occurrence of failure in the DSn level signals (n=1, 1C, 2). Thus, the conversion unit 38a converts the alarm signal DSn-AIS of the DSn level to the VT-level. In this construction, the out-of-use signal VT-UNEQ is transmitted in the VT-level to those paths that are not used in the cross connect switch 33. As a result, it is also possible to construct such that the converter 38a converts the DSn level alarm indication signal DSn-AIS to the out-of-use signal of the VT-level, VT-UNEQ, and transmit the same as the failure signal.

It should be noted that the cross connect switch 33 of the nodes D and J achieves a cross connection in the VT-level similarly to the cross connect switch 13 of FIG. 6. When a failure occurs in the in the DSn level at a site X between the mapping unit 38 of the node D and the demapping unit 40 of the node J, the channel part 36 of the node D detects the loss of the DSn signal and produces a DSn level alarm indication signal DSn-AIS in response thereto. The DSn-AIS signal is then converted to the VT-level failure signal such as the VT-AIS or VT-UNEQ, wherein the VT-level failure signal is then sent out on the west side path WS to the node E via the cross connect switch 33.

When a failure occurs between the demapping unit 40 of the node D and the mapping unit 38 of the node J, the conversion unit 38a of the node J produces the VT-level failure signal such as the VT-AIS or VT-UNEQ similarly as above, and sends out the failure signal thus produced on the west side path WS to the node I (see FIG. 5) via the cross connect switch 33.

Figure 10:
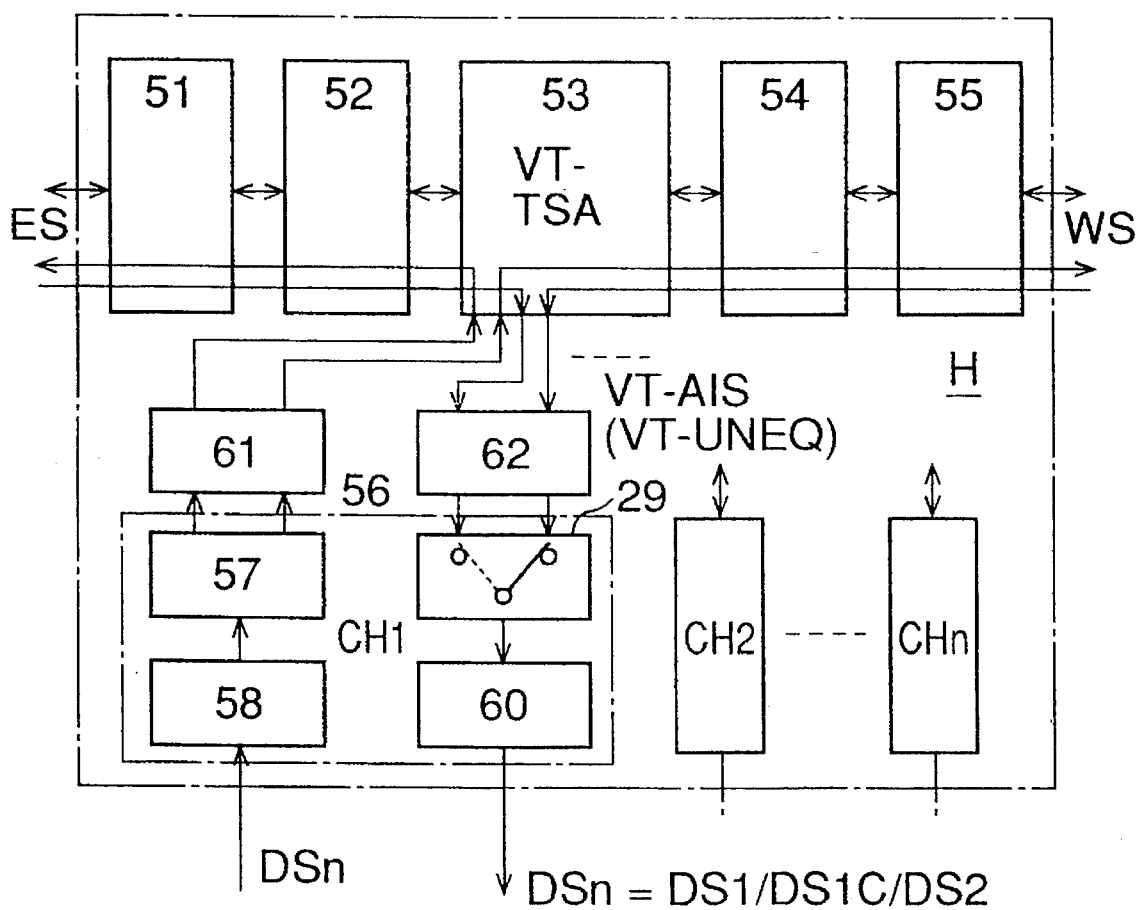
FIG. 10 is a diagram showing the construction of a reception side node used in the second embodiment.

FIG. 10 shows the construction of the reception node used in the second embodiment, wherein the reception node corresponds to the node H of FIG. 5.

Referring to FIG. 10, the node H includes photoelectric conversion units 51 and 55 connected to the east side path ES and the west side path WS respectively for receiving optical signals and for converting the same to electric signals and for converting electric signals supplied thereto to corresponding optical signals for sending out the same on the east side path ES and the west side path. Further, a multiplexing unit 52 is connected to the photoelectric conversion unit 51 for multiplexing VT-level signal components to be transmitted on the east side path ES after photoelectric conversion in the photoelectric converter 31. The multiplexing unit 52 further achieves demultiplexing of the VT level signals received by the photoelectric conversion unit 51 to respective signal components. Similarly, a multiplexing unit 54 cooperates with the photoelectric conversion unit 55. Both of the multiplexing units 52 and 54 are connected to a cross connect switch 53 corresponding to the cross connect switch 13 of the previous embodiment, wherein the cross connect switch 53 achieves a cross connection of the signal components by carrying out an exchange of time-slots of the signal components in the VT-level.

Similarly as before, the node H includes a number of channel parts 56 (CH1, CH2, ... CHn) cooperating with the cross connect switch 53, wherein each channel such as the channel CH1 includes a mapping unit 58 for mapping the DSn signals such as the DS1 signal having the transmission rate of 1.544 Mbps, the DS1C signal having the transmission rate of 3.152 Mbps, the DS2 signal having the transmission rate of 6.312 Mbps, to the VT level. The VT level signal thus produced by the mapping unit 58 is subjected to a multiplexing in a multiplexing unit 57 and is sent to the cross connect switch 53 for insertion to the VT level signals in the ring network. Further, there is provided a path switch 59 of the VT level, wherein the path switch 59 selects one of the east side path ES and the west side path WS for reception. The VT level signal is then supplied from the path switch 59 to a demapping unit 60 that conducts a demapping of the VT level signals to the DS3 level. It should be noted that the path switch 59 is connected to the cross connection switch 53 via an branching unit 62 that achieves branching of the signals in the VT-level.

As described already, the VT-level failure signal such as the VT-AIS or VT-UNEQ causes, when supplied from the node J and received by the channel part 56 via the cross connection switch 53, the switching of the VT path switch 59 such that the reception path switches from the west side path WS to the defect-free east side path ES as indicated by a broken line in FIG. 10.

Thus, in the composite ring network in which the ring networks 6a and 6b of FIG. 5 are connected by the DSn level signals, the occurrence of failure in the DSn level path results in a transmission of the VT level failure signal, which the path switch of the reception side node can detect. Thus, upon switching of the path in response to such a VT level failure signal, the communication is successfully maintained even when such a failure occurred in the DSn level.

Figure 11:
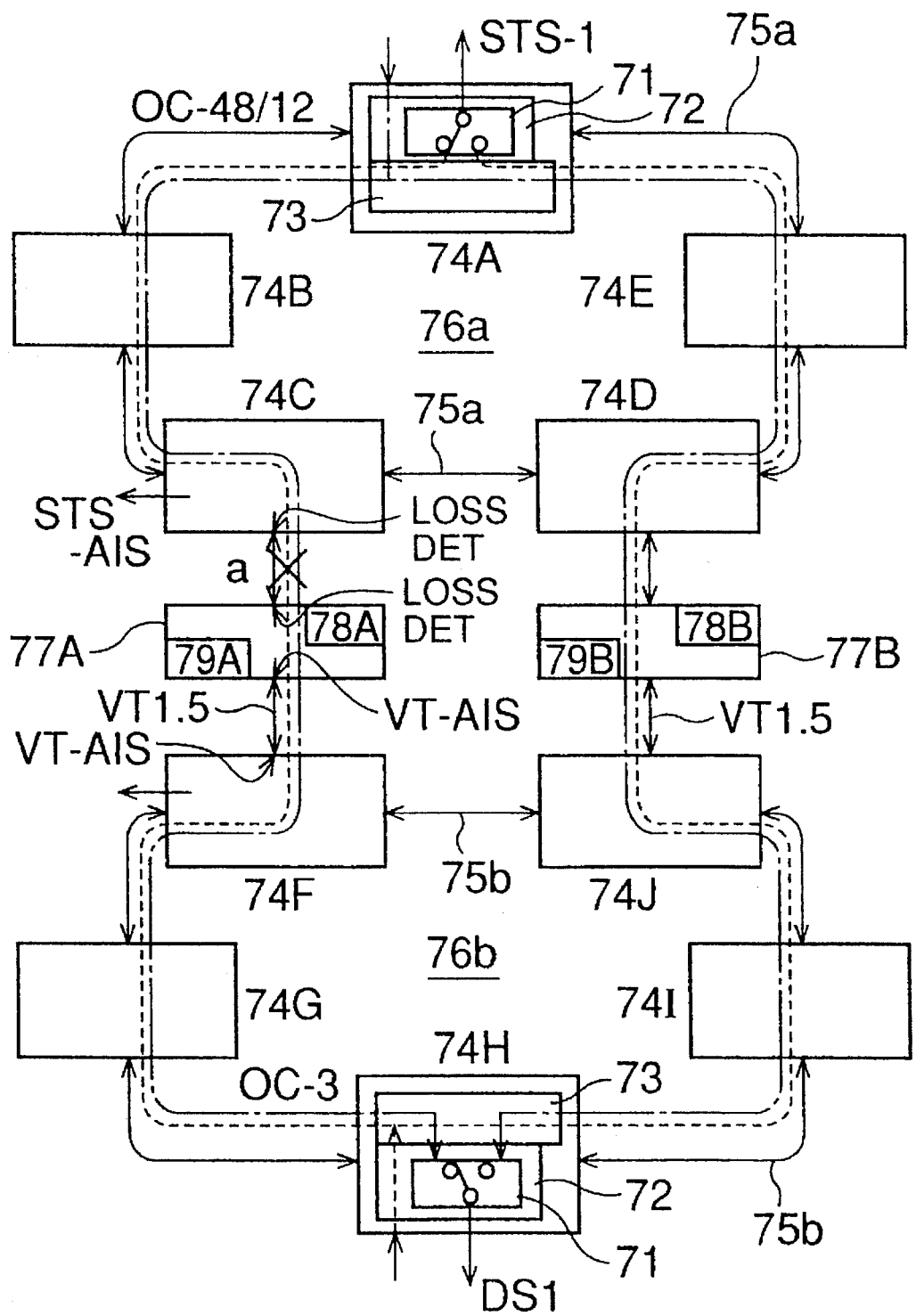
FIG. 11 is a diagram showing the construction of a third embodiment of the present invention for a case in which a failure of an STS-level signal has occurred.

FIG. 11 shows a third embodiment of the present invention, showing the case wherein a failure has occurred in a composite ring network.

Referring to FIG. 11, two ring networks 76a and 76b are connected with each other to form a larger composite ring network, wherein the ring network 76a includes nodes 74A–74E while the ring network 76b includes nodes 74F–74J.

It should be noted that each of the nodes 74A–74E carries STS-level signals and includes a cross connect switch 73 and channels 72 similarly as before, wherein each of the channels 72 includes a path switch 71 that switches the STS level path. The ring network 76a as a whole carries OC-48 level optical signals having a transmission rate of 2.4 Gbps or OC-12 level optical signals having a transmission rate of 600 Mbps, wherein the OC-48 level optical signals and the OC-12 level optical signals are formed as a result of multiplexing of the STS-level signals that may have a bit rate of 51.84 Mbps.

The ring network 76a is connected to the ring network 76b by means of intervening multiplexing units 77A and 77B, wherein the multiplexing unit 77A is connected to the node 74C of the ring network 76a and further to the node 74F of the ring network 76b, while the multiplexing unit 77B is connected to the node 74D of the ring network 76a and further to the node 74I of the ring network 76b. Thereby, the connection between the node 74C and the multiplexing unit 77A and the connection between the node 74D and the multiplexing unit 77B are achieved by means of the STS-level path.

The ring network 76b, on the other hand carries a VT-level communication and thus, the path switch 71 of the nodes 74F–74J carries out the path switching in the VT-level. Thus, in the ring network 76b, the cross connect switch 73 achieves the cross connection as well as branching and insertion of VT-level signals in the VT-level, while the channel 72 carries out the mapping of the DS1 signal of the 1.544 Mbps transmission rate to the VT-level. In the ring network 76b, the foregoing VT level signals are multiplexed to form an optical signal of the OC-3 format having a transmission rate of 150 Mbps. Thus, it will be noted that the node 74F of the ring network 76b and the multiplexing unit 77A, as well as the node 74J and the ring network 77B, are connected with each other by a VT-level path, which may carry a VT1.5 signal having a transmission rate of 1.754 Mbps.

In the composite ring network of FIG. 11, it should also be noted that insertion and branching of the DS-1 level signals is achieved in other nodes 74G–4I, as well.

In the foregoing construction, it will be noted that each of the conversion units 77A and 77B carries out a conversion between the STS-level signals and the VT-level signals, while the conversion units 77A and 77B include respectively failure detection parts 79A and 79B for issuing a VT-level alarm indication signal VT-AIS upon detection of loss of the VT-level signals. The VT-level alarm indication signal VT-AIS is then supplied from the failure detection parts 79A and 79B to respective conversion parts 78A and 78B for conversion to the STS-level, wherein STS-AIS signals are produced by the conversion parts 78A and 78B. The STS-level alarm indication signal is then supplied to other nodes such as a node 74A via the node 74C.

It should be noted that the foregoing parts 78A and 78B also act to detect the loss of the STS-level signals and issue an STS-level alarm indication signal STS-AIS in response thereto. In other words, the foregoing conversion parts 78A and 78B act also as a detection part for detecting the loss of the STS-level communication. Thus, the foregoing detection parts 79A and 79B convert the STS-level alarm indication signal STS-AIS to the VT-level. Thus, the detection parts 79A and 79B also act as a conversion pat of the STS-AIS signal. It should be noted that such a function of the parts 78A, 78B or 79A, 79B is easily realized by microprocessor.

In the system of FIG. 11 where the node 74A of the ring network 76a and the node 74H of the ring network 76b communicate with each other via paths of the DS1 level as indicated by a dotted line and a one-dotted line, it will be noted that the path switch 71 of the node 74A selects the side of the node 74B and the path switch 71 of the node 74H selects the side of the node 74G. When a failure occurs in this state in the STS-level path at a site a between the node 74C and the multiplexing unit 77A, the conversion part 78A issues the STS-AIS signal and the detection part 79A converts the same to the VT-level and produces a VT-AIS signal of the VT-level. The VT-level alarm indication signal VT-AIS thus produced is then transmitted to the node 74F.

Further, the node 74C also detects the loss of the STS-level communication and transmits an STS-level alarm indication signal STS-AIS indicative thereof to the node 74B. Thereby, the node 74A of the first ring network 76a detects the STS level alarm indication signal normally and without problem, and there occurs a switching of the path switch 71 in the node 74A from the side of the node 74B to the side of the node 74E connected to the path free from defects. In the node 74H of the second ring network 76b, on the other hand, the path switch 71 detects the VT-level alarm indication signal VT-AIS, and the path switch 71 switches path from the side connected to the node 74G to the side connected to the node 74I that is free from defects. In response thereto, the communication between the nodes 74A and 74H is maintained via the nodes 74E, 74D, the conversion unit 77B, and the nodes 74J and 74I.

Figure 12:
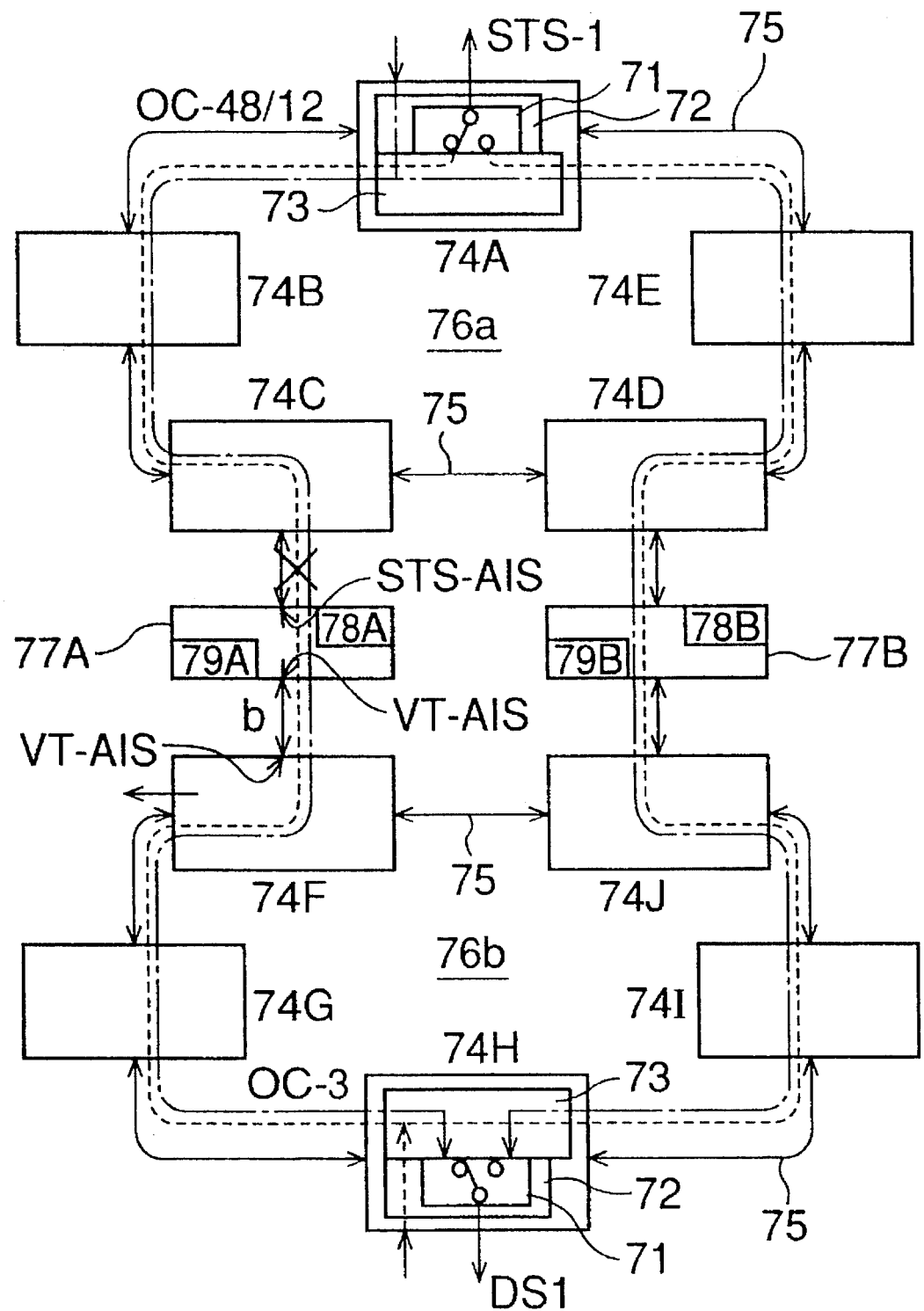
FIG. 12 is a diagram showing the construction of the third embodiment for a case in which a failure of a VT-level signal has occurred.

FIG. 12 shows the case where the VT-level signal is lost in the composite ring network of the present embodiment. It shill be noted that FIG. 12 shows the state similar to FIG. 11 in that the path switch 71 of the node 74A selects the side of the node 74B while the path switch 71 of the node 74H selects the side of the node 74G, and the communication is established between the node 74A and the node 74H.

Considering the case of breakout of failure at a site b between the node 74F and the multiplexing unit 77A, it will be noted that the node 74F detects the loss of the VT-level signals between the node 74F and the multiplexing unit 77A and issues an alarm indication signal VT-AIS in the VT-level. Thus, the path switch 71 of the node 74H detects the VT-AIS signal and causes a switching from the side of the node 74G to the side of the node 74I.

On the other hand, the detection part 79A of the conversion unit 77A detects the loss of VT-level signals and issues a VT-level alarm indication signal VT-AIS, wherein the VT-AIS signal thus issued is forwarded to the conversion unit 78A that converts the VT-AIS signal to the STS-AIS signal of the STS-level. The STS-level alarm indication signal STS-AIS thus formed is then transmitted to the node 74C, while the STS-AIS signal is then transmitted to the node 74A via the node 74B.

In the node 74A, the path switch 71 therein detects the STS-level alarm indication signal STS-AIS and causes a switching from the side of the node 74B to the side of the node 74E. Further, the node 74F detects the loss of the VT-level signals and sends the VT-level alarm indication signal VT-AIS as already noted. Thus, the path switch 71 of the node 74H selects the defect free side of the node 74I in response thereto. Thus, a communication path that avoids the site b of failure is established between the nodes 74A and 74H, via the nodes 74E and 74D, the multiplexing unit 77B, and the nodes 74J and 74I. In this switching of the path, it should be noted that twenty eight paths of the VT1.5 signals are switched simultaneously, associated to the conversion of the VT-level alarm indication signal VT-AIS to the STS-level alarm indication signal STS-AIS.

In the present embodiment, too, it is possible to use the out-of-use signal in place of the alarm indication signal AIS of the VT-level or STS-level.

It should be noted that the present invention is by no means limited to the synchronous and asynchronous signals described heretofore, but also applicable to the networks that use other standard signals. Further, the present invention is effective also in the composite ring networks wherein more than two ring networks are connected.

Further, the present invention is not limited to the embodiments described heretofore, but various variations and modifications may be made without departing from the scope of the invention.

What is claimed is:

1. A composite ring network comprising:

a plurality of ring networks each including a plurality of nodes;

each of said nodes having first and second paths extending therefrom for carrying an information signal, said first and second paths being connected to other nodes of said composite ring network, each of said nodes comprising:

a cross connect switch connected to said first and second paths for establishing a cross connection therebetween; and a channel part connected to said cross connect switch and capable for sending a signal on both of said first and second paths simultaneously via said cross connect switch, said channel part selectively receiving an information signal from one of said first and second paths via said cross switch, said channel part including a path switch for selecting one of said first and second paths;

two of said ring networks being connected with each other at a pair of nodes, one of said two nodes being included in a first ring network and the other being included in a second ring network, by a bridging path;

each of said plurality of nodes including an alarm generation unit for generating a failure signal, when a failure has occurred in said bridging path, with a such format that said failure signal can be detected by said nodes forming said plurality of ring networks;

said path switch of said nodes selecting, in response to said failure signal supplied thereto via one of said first and second paths, a path other than said path that has carried said failure signal.

2. A composite ring network as claimed in claim 1, wherein said channel part and said cross connect switch are connected, in each of said nodes, by a synchronous signal path carrying synchronous signals having a synchronous signal format wherein said bridging path forms an asynchronous signal path that carries asynchronous signals having an asynchronous signal format, wherein said path switch includes a switch circuit for selecting a path other than said path that has carried said failure signal, upon reception of a synchronous failure signal as said failure signal, and wherein said alarm generation unit issues said failure signal in said synchronous signal format, upon detection of failure in said bridging path.

3. A composite ring network as claimed in claim 2, wherein said synchronous signals are of an STS (synchronous transmittal signal)-level format.

4. A composite ring network as claimed in claim 2, wherein said synchronous signals are of a VT (virtual terminal)-level format.

5. A composite ring network as claimed in claim 1, wherein said channel part transmits, upon occurrence of failure in said bridging path, said failure signal either in the form of an alarm indication signal indicative of failure occurred in a transmission path in said ring networks forming said composite ring network or in the form of an out-of-use signal indicative of unused path in said ring networks forming said composite ring network, said channel part transmitting said failure signal in accordance with a signal format used between said cross connect switch and said channel part.

6. A composite ring network, comprising:

first and second ring networks each including a plurality of nodes;

each of said nodes having first and second paths extending therefrom for carrying an information signal, said first and second paths being connected to other nodes of said ring network, each of said nodes comprising:

a cross connect switch connected to said first and second paths for establishing a cross connection therebetween;

a channel part connected to said cross connect switch and capable for sending an information signal on both of said first and second paths simultaneously via said cross connect switch, said channel part selectively receiving an information signal from one of said first and second paths via said cross connect switch, said channel part including a path switch for selecting one of said first and second paths;

said first ring network carrying signals with a first signal format;

said second ring network carrying signals with a second, different format;

said first and second ring networks being connected with each other at a pair of nodes, one of said pair of nodes being included in said first ring network and the other being included in said second ring network, by a bridging path;

said bridging path receiving a first signal from said first ring network with said first signal format at a first end connected to said first ring network for sending a second signal to said second ring network with said second signal format at a second end connected to said second ring network, by converting the signal format of said first signal from said first signal format to said second signal format, said bridging path receiving a third signal from said second ring network at said second end with said second signal format for sending a fourth signal on said first ring network at said first end with said first signal format, by converting the signal format of said third signal from said second signal format to said first signal format;

wherein said bridging path includes a converter for converting the signal format of a failure signal, which is issued in said bridging path upon a failure in said bridging path, to said first signal format and sending said failure signal thus converted to said first ring network, said converter converts the signal format of said failure signal to said second signal format and sending said failure signal thus converted to said second ring network, such that said path switch of said nodes is activated in response to said failure signal to select one of said first and second paths in response thereto.

7. A composite ring network as claimed in claim 6, wherein said bridging path issues said failure signal in said first signal format upon occurrence of a loss of signals having said first signal format and incoming to said bridging path from said first end, said bridging path issues said failure signal in said second signal format upon occurrence of a loss of signals having said second signal format and incoming to said bridging part from said second end, and wherein said converter converts said failure signal of said first signal format to said second signal format and sends out said failure signal thus converted to said second signal format to said second ring network from said second end, and said failure signal of said second signal format to said first signal format and sends out said failure signal thus converted to said first signal format to said first ring network from said first end.

8. A composite ring network as claimed in claim 7, wherein said signals of said first signal format have an STS (synchronous transmittal signal)-level format, and wherein said signals of said second signal format have a VT (virtual terminal)-level format.

9. A composite ring network as claimed in claim 6, wherein said first ring network transmits said information signal in the form of an optical signal on which said signals of said first signal format are multiplexed, and wherein said second ring network transmits said information signal in the form of an optical signal on which said signals of said second signal format are multiplexed.

* * * * *